G. BRYAR.
TROLLEY.
APPLICATION FILED OCT. 22, 1921.
1,419,955.
Patented June 20, 1922.
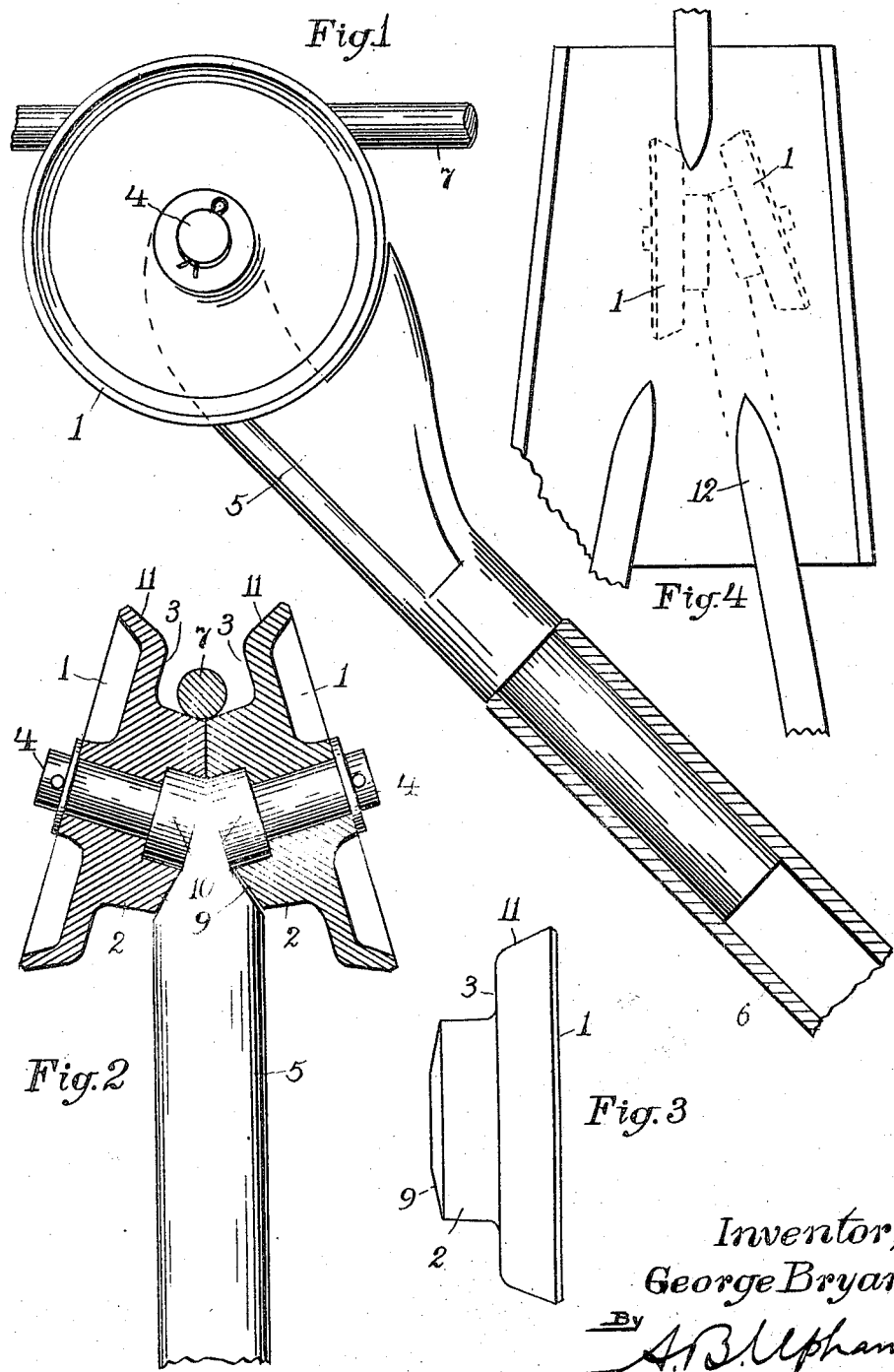
Inventor,
George Bryar;
By A. B. Upham,
Attorney.

UNITED STATES PATENT OFFICE.

GEORGE BRYAR, OF BOSTON, MASSACHUSETTS.

TROLLEY.

1,419,955.

Specification of Letters Patent.  Patented June 20, 1922.

Application filed October 22, 1921.  Serial No. 509,567.

*To all whom it may concern:*

Be it known that I, GEORGE BRYAR, a citizen of the United States, residing at Boston, in the county of Suffolk and State of Massachusetts, have invented certain new and useful Improvements in Trolleys, of which the following is a specification.

One of the great troubles found inherent in the well-known under-running trolley is its liability to jump its wire and thereby to bend its pole by impact with a span-wire, and, further, to entail bother and delay in its return to the trolley wire. The object of this invention is the effecting of such improvements in the trolley as shall greatly diminish if not wholly prevent any accidental dislodgment of the kind.

To this end, I so construct the trolley that, instead of its having a V-groove to present to the wire, one is provided whose side-walls overhang somewhat, so that a lateral pressure instead of crowding the wire up and out from the groove, shall tend to force it down into the groove. I have found that this cannot be done by any form of groove in a single wheel, but that it can be accomplished by providing two wheels each having a flange on its side opposite to the other wheel, and by so inclining the axes of the wheels as to produce the desired overhang.

In the drawings forming part of this specification, Fig. 1 is a side view of a trolley embodying my invention. Fig. 2 is a vertical section thereof. Fig. 3 is an edge view of one of the wheels alone. Fig. 4 is a view from beneath of a switch frog showing the improved trolley in dotted lines.

As shown in Figs. 2 and 3, the wheels 1 consist of a hub 2 and a flange 3, in each instance, rotatably mounted on spindles 4 which project from a body 5 at a relatively oblique angle, but preferably in the same vertical plane when the trolley pole 6 is in normal presentation to its wire 7. The hubs 2 are disposed to contact at their upper point which is the one presented to the wire 7, but are widely separated at their lowermost points, as shown in Fig. 2, but the inner surface of each is given a flat taper, as at 9, in order that such surfaces 9 may contact from the point where the hubs engage the trolley wire 7 down to the base of the pivots or spindles 4, whereby, as the hubs wear smaller in use, there may be no widening of the line between them. To strengthen the spindles 4 in case they are made integral with the body 5, or to provide material to receive them if the spindles are made detachable, the bases 10 of the spindles are made materially larger in diameter than the spindles, and the wheels 1 are recessed to receive such bases.

As shown in Fig. 2, the flanges 3 beside the wire 7 are, by the above described construction, made so to overhang the hubs as to render it impossible by any side pressure given to the trolley for the latter to crowd itself down and away from its engagement therewith. Inasmuch, however, as this overhang narrows the mouth of the groove and thereby renders it harder to engage the trolley with the wire, I provide each flange 3 with a rim 11 so tapered as to provide a wide mouth for presentation to the trolley wire and consequently to make its return to the wire comparatively easy.

As illustrated in Fig. 4, the angular arrangement of the two wheels gives them a wide presentation to the switch-tongue, as 12, toward which they are presented and thereby ensures their engagement therewith.

What I claim is:

A trolley comprising two wheels having relatively inclined axes, each wheel consisting of a hub and a flange, the ends of the hubs contacting at their points of normal engagement with a trolley wire, the flanges being by the inclination of their axes caused to overhang the wire, and each flange having a conically disposed rim for easier engagement with the wire when being returned thereto.

In testimony that I claim the foregoing invention, I have hereunto set my hand this 20th day of October, 1921.

GEORGE BRYAR.